No. 814,975. PATENTED MAR. 13, 1906.
F. H. MASON.
AUTOMATIC BALANCED VALVE.
APPLICATION FILED MAY 25, 1903.
3 SHEETS—SHEET 1.
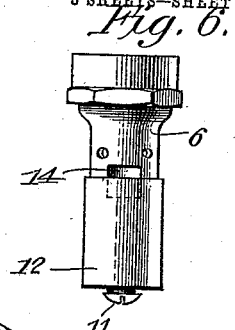
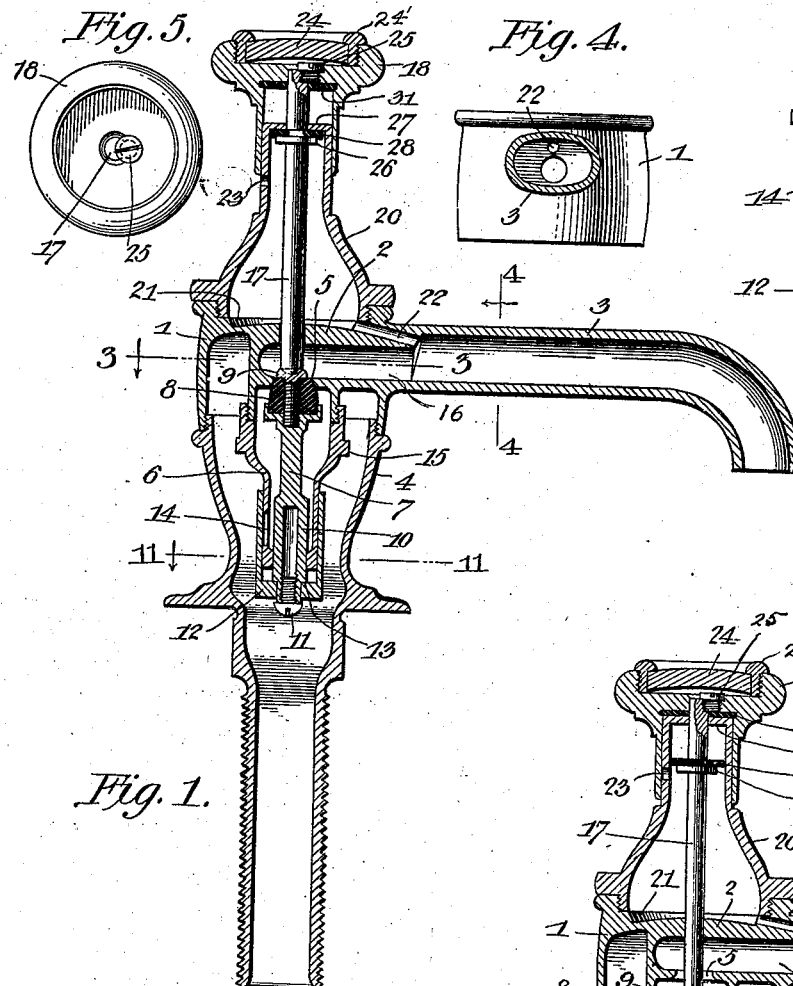
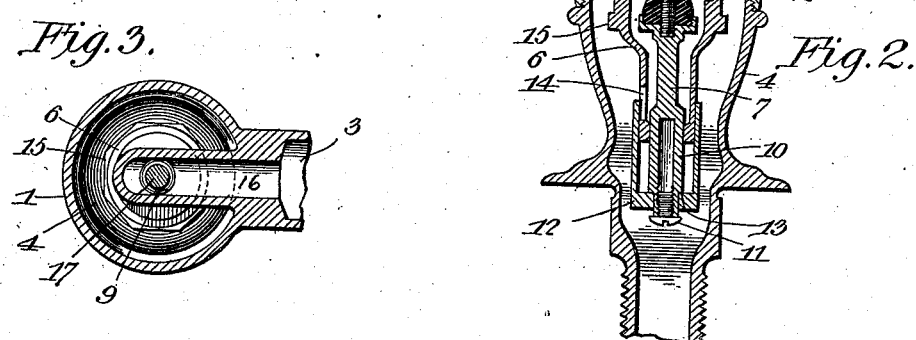
F. H. Mason, Inventor.

No. 814,975. PATENTED MAR. 13, 1906.
F. H. MASON.
AUTOMATIC BALANCED VALVE.
APPLICATION FILED MAY 25, 1903.
3 SHEETS—SHEET 2.
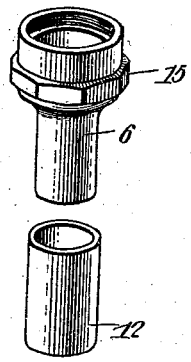
Fig. 8.
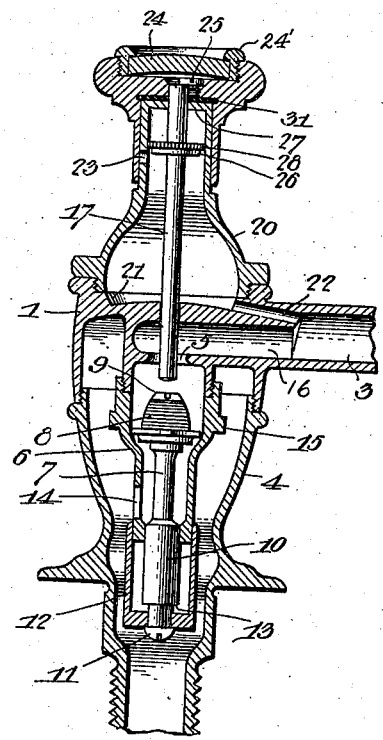
Fig. 7.
Fig. 9.
Fig. 11.
Witnesses
F. H. Mason, Inventor.
Attorneys

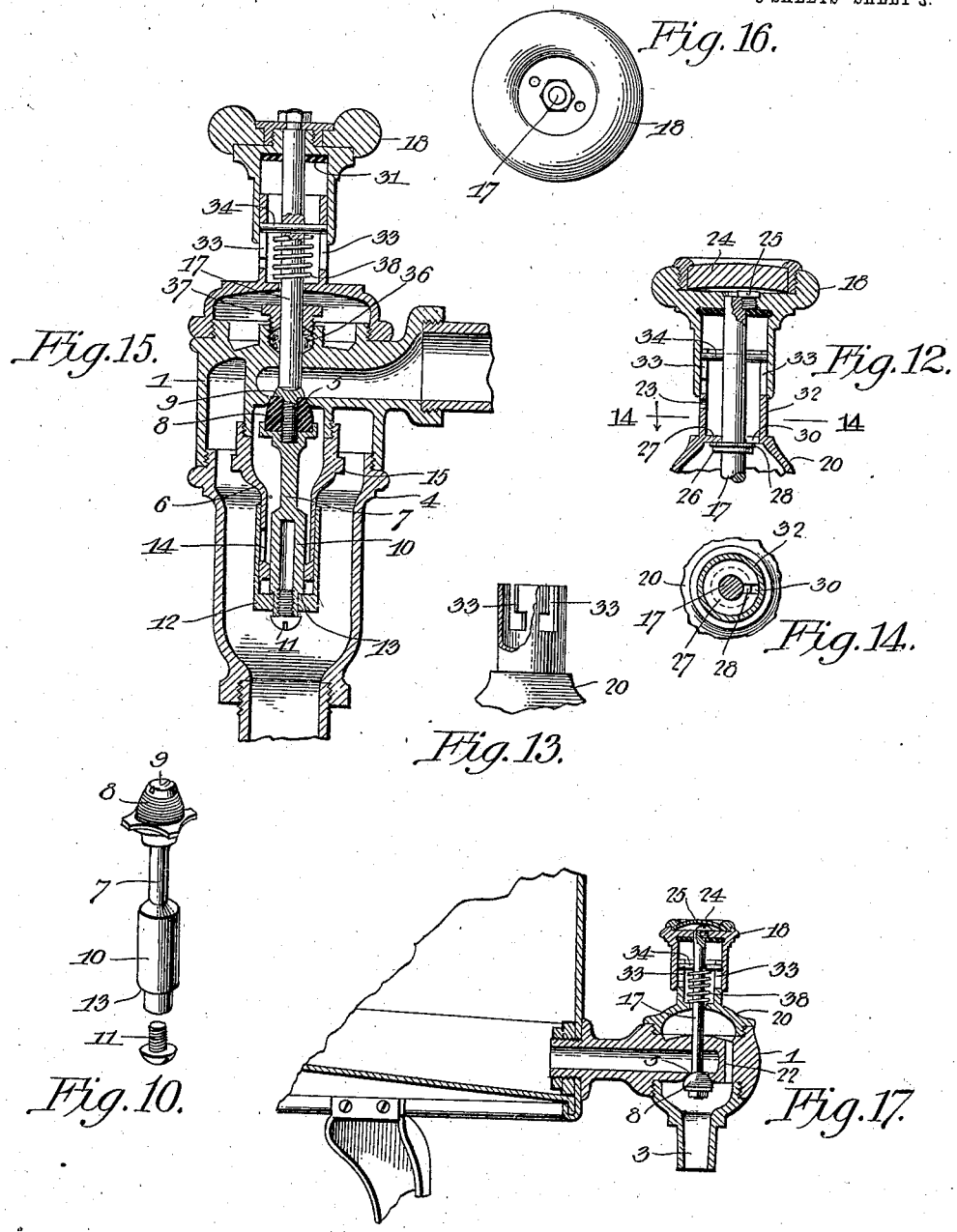

UNITED STATES PATENT OFFICE.

FREDERIC H. MASON, OF SPOKANE, WASHINGTON.

AUTOMATIC BALANCED VALVE.

No. 814,975.　　　　　Specification of Letters Patent.　　　Patented March 13, 1906.

Application filed May 25, 1903. Serial No. 158,689.

*To all whom it may concern:*

Be it known that I, FREDERIC H. MASON, a citizen of the United States, residing at Spokane, in the county of Spokane and State of Washington, have invented a new and useful Automatic Balanced Valve, of which the following is a specification.

My invention relates to valves for controlling the flow of fluids, as water, steam, air, &c.

The objects of my invention are to provide a valve which may be opened by any preferred external means, manual or mechanical, against the pressure of the fluid and may be closed positively, gradually, and automatically by the said pressure unaided by springs, without any chattering, hammering, or ramming action incidental to the movement of valves or the stoppage of the fluid or other cause where high pressures are employed; to produce such a valve as described which will be normally held on its seat by the pressure of the fluid, but which will automatically leave its seat when not subject to such pressure; to automatically admit air to the valve, so that the accumulated fluid may quickly escape and so prevent the freezing of the fluid therein; to avoid the use of packing in order to reduce friction while at the same time the leaking of the fluid is prevented; to avoid the necessity of making adjustments to compensate for the wear of the valve proper; to induce by suction a rapid drainage of the accumulated fluid, so as to prevent any afterflow of the fluid after the valve has been closed; to make the casing in sections, so that parts may be exchanged for others of different character, and to provide a valve whose parts will be kept free from mud, slime, or other harmful matter.

Referring to the drawings, Figure 1 is a vertical section of a valve constructed in accordance with the invention, the valve being shown in closed position. Fig. 2 is a similar view showing the valve in open position. Fig. 3 is a sectional plan view of a portion of the valve on the line 3 3 of Fig. 1. Fig. 4 is a transverse sectional elevation through the discharge-spout on the line 4 4 of Fig. 1. Fig. 5 is a plan view of the knob with the disk 24 removed. Fig. 6 is an elevation of the valve-retarding device removed from the casing. Fig. 7 is a view corresponding to Fig. 1, showing the position of the parts when the pressure is removed. Figs. 8 and 9 are detail perspective views of the two members of the retarding device detached. Fig. 10 is a similar view of the valve and valve-stem. Fig. 11 is a sectional plan view on the line 11 11 of Fig. 1, drawn to an enlarged scale. Fig. 12 is a detail sectional view of a form of knob and bonnet to be used when the valve is to be locked in open position. Fig. 13 is a detail view of the bonnet. Fig. 14 is a sectional plan view on the line 14 14 of Fig. 12. Fig. 15 is a sectional view of a form of valve to be used in connection with a radiator. Fig. 16 is a plan view of the knob used for the radiator-valve. Fig. 17 is a sectional view of a valve to be used for coffee-urns, water-coolers, wine-casks, and the like.

1 is the central section of one from of a valve constructed in accordance with my invention. This section includes the transverse bridge 2 and the spout or nozzle 3. The lower end of the section 1 is threaded to receive the threaded upper end of the lower section 4 and is provided with the valve-seat 5, opening into the lower side of the inner end of the passage 16, from which spout 3 leads.

A fluid-inlet member or casing 6 is within the section 4 and has its upper end secured by screw-threads to a flange surrounding the valve-seat 5. Within this member 6, which may be considered a valve-protector, is a valve-stem carrying at its upper end a valve 8, adapted to the valve-seat 5 and secured to the stem by the screw 9. The lower end 10 of the valve-stem constitutes a plunger, which reciprocates in an opening in the bottom of the casing 6. The lower end of the piston, which is below or beyond the casing 6, has a reduced portion into which a screw 11 is passed to secure thereto the shell or cup-shaped valve member 12, freely rotatable on the said reduced portion of the piston. The shoulder 13, formed by reducing the piston, acts as a stop for the upward movement of the member 12. Preferably the reduced portion of the piston is slightly longer than the thickness of the bottom of the member 12 in order that the parts may be lubricated by the water, the screw-head may not bind the member, and the cost of manufacture may be reduced, since skilled labor is not required to make, fit, or assemble the parts, they not requiring a nicety of adjustment or machine-work.

The member 6 is near its bottom provided with one or more ports 14, whereby when the member 12 is lowered so as to uncover the port 14, as shown in Fig. 2, the fluid surrounding the casing 6 will enter the latter and pass out through the opening in the valve-seat 5 and through the spout 3.

The member 6 has an angular wrench-engaging face 15, by which it may be turned in assembling the valve. This face 15 and all enlargements of the member 6 are at a considerable distance above the top of the member 12 in order that as the valve 8 wears the member 12 may slide up on the member 6 to compensate therefor.

As a means for moving the valve 8 off from its seat I have shown a valve-rod 17 extending through an opening in the bridge 2 and provided at its upper end with a knob 18. The lower end of the rod is rounded and fits in a shallow cavity in the head of the screw 9. This rod extends up through the bonnet or upper section 20 of the valve-casing, the bottom of this section being secured by screw-threads to the top of the section 1.

The top of the bridge 2 is recessed to form a space 21, into which fluid may flow around the valve-operating rod 17, this space and the space within the bonnet 20 forming a drainage-chamber, whose center slopes toward the periphery of the space 21.

The fluid-passage 16 lies beneath the bridge 2 and extends slightly in front thereof. It is considerably smaller than the passage in the spout 3, and the outer end of the passage 16 merges by a taper into the interior surface of the spout. The bottom of the space 21 is connected to the taper portion of the discharge passage or spout 3 by a relatively small or contracted passage 22, which is inclined downwardly toward the spout. The passage 22 may be drilled, as the space 21 is comparatively shallow.

On top of the bonnet or section 20 is the knob 18, having a depending sleeve which reciprocates over the upper end of the bonnet. The bonnet is provided with a vent which is uncovered by the sleeve of the knob when in its highest position, as shown in Fig. 1, and closed when the same is lowered, as shown in Fig. 2. The knob 18 is provided on the top with a removable disk 24, bearing a mark indicating the kind or quality of the fluid which it controls, it being held in a recess in the knob by a flanged ring 24', whose periphery is threaded into corresponding threads in the recess, the disk being held in by a shoulder on the interior of the ring. The upper end of the rod 17 is inserted in a hole in the knob, and a screw 25, partly in the rod and partly in the knob, prevents the knob and rod from independent movement, and consequently separation.

Within the upper portion of the bonnet 20 I provide the rod 17 with a flange or collar 26, on which rests a ring 28, of rubber or the like, so that when the rod comes to its normal position, which is when the ring 28 engages with the flange 27 of the bonnet, there will be no shock or noise. To lessen the noise when the valve-rod is depressed, I provide the bottom of the knob with a cushion disk or ring 31, which will contact with the flange 27.

I may, as shown in Fig. 12, provide the flange 27, which is here below the vent 23, with a recess 30, so as to leave a vent-opening at one side of the packing-ring between the drainage-chamber and the vent 23.

In Figs. 12, 13, and 14 I have shown a method whereby the valve may be locked open. The upper or sleeve portion 32 of the bonnet is provided with opposite bayonet-slots 33, and the operating-rod 17 has a cross-pin 34 projecting into said slots. When the knob has been depressed sufficiently, the rod is turned until the pin 34 enters the branch portions of the bayonet-slots, and thus the valve is locked open. The branches of the slots will be located at such a position as the service may demand.

When the valve is applied to radiators or to devices requiring similar work for the valve, I find it advisable to use a stuffing-box, as shown on Fig. 15, where 36 designates the packing, and 37 the gland, located between the passage 16 and the bonnet. In this case it is also desirable to use a spring 38, seated between the top of the bonnet and the pin 34, to assist in moving the rod to its normal or raised position, though in most cases it will not be necessary. Its position protects it from the steam, and it is readily accessible for renewal in case the spring should be accidentally broken.

In Fig. 17 I have shown my valve for use where the fluid flows by gravity, as in coffee-urns or receptacles for milk, cider, &c. Here the retarding device will not be necessary, though the knob, the drainage-chamber, and vent are all retained. The spring is protected from corrosion.

The operation is as follows: Supposing the pipe which supplies the valve is filled with fluid under pressure and the parts are as shown in Fig. 1, the pressure of the fluid acting against the bottom of the member 13 will hold the valve 8 on its seat 5. When pressure of any kind—such as that which may be exercised manually, mechanically, or through the intervention of a suitable electrical appliance—is applied to the valve-stem, the latter is at once moved away from its seat and carries with it the cup-shaped valve member 12, thus opening the port or ports 14 in the ported inlet member 6. The movement at this time is to a considerable degree dependent upon the cup-shaped valve member 12, as a suctional force of considerable extent is developed below the inlet member and the fluid is drawn down through the space between the cup-shaped member and the ported inlet member, so that this space is gradually filled with the fluid and at the same time fluid to some extent enters between the cup-shaped member 12 and the inlet member to a point below said piston and also enters in small quantities around the lower reduced end of stem 7. The valve being now opened and the opening pressure released, the closing operation results from the pressure of the fluid which the valve controls, and this pressure is of course exercised principally on the lower portion of the cup-shaped member 12. The member 12 naturally moves to a closed position, and this movement to some extent is assisted by the pressure on the lower surface of the valve and the flow of the current of fluid as in its passage it passes the valve. The closing pressure is materially resisted by the presence of the fluid in the space below the inlet member 6, and thus operates somewhat after the character of the familiar dash-pot, the fluid escaping very slowly between the inlet member 6 and the cup-shaped member 12, so that the closing movement of the valve is very slow and gradual and its movement cannot be materially hastened by fluctuation in the pressure of the fluid, so that all chattering and hammering of the valve member is entirely obviated. The valve closes gradually and quietly to its seat and effectually cuts off the flow of the fluid until the next operation.

In a device constructed in accordance with this invention it is apparent that all hammering consequent to the gradual contraction of the opening around the valve against fluid under high pressure will be avoided. When a valve of ordinary construction is moved to its seat, the discharge-opening between the valve and seat is gradually reduced in area, and if the fluid is under any reasonably high pressure the valve will chatter against its seat until fully closed, or if held partly open during either a closing or opening movement this chattering or groaning and buzzing noise will occur. In the present case this is rendered impossible, for the reason that during the closing movement of the valve the slidable or movable cup-shaped member will gradually close the ports of the stationary member and will thus gradually tend to reduce the pressure in proportion to the extent of travel of the valve-seat, and at the point where the majority of valves begin to chatter the port or ports of the stationary member will be fully closed and the main valve will be allowed to quietly assume a full closed position. When the valve is open, as shown in Fig. 2, the vent 23 is closed, so as to form an air-cushion to resist the inflow of fluid into the drainage-chamber. Just at the time when the valve closes the vent 23 is opened in order that air may have access to such fluid as may be in the drainage-chamber, thus allowing the fluid to escape very quickly through the passage 22. When the fluid rushes beyond the passage 16, it gradually expands for the length of the tapered portion of the passage and so gradually produces a suction or vacuum at this place. As the passage 22 is connected at said place the fluid in the drainage-chamber will be sucked out by the expansion of the fluid in the discharge-passage of the spout 3.

It is apparent that my retarding device may be used as an automatic air-vented check-valve or as an air-valve for steam-radiators and the like. It may have various other applications not above enumerated, and I do not desire to be limited to any particular application thereof.

The broad features of the present invention are claimed in my application, Serial No. 181,579, filed November 18, 1903, and the following features—to wit, the reduced bonnet extension with a vent therein and the vented bonnet-sleeve and the knob with a sleeve fitting over the bonnet-sleeve, in combination with the main valve and the regulating device therefor and with the drainage-chamber and its discharging means—are claimed in my application, Serial No. 153,413, filed April 20, 1903.

My invention is capable of many modifications, and I desire to include within the protection of my claims all changes which employ the principles of the same.

Having described my invention, I claim—

1. In combination, a valve, a valve-seat therefor, a valve-stem having a piston member, a stationary ported member forming a protecting device for the valve, and a cup-shaped member slidable upon the stationary member and serving as an auxiliary valve, said cup-shaped member having a loose connection with the valve-stem.

2. In a device of the class specified, the combination with a main valve, a discharge-spout, a valve-seat, a valve, a valve-chamber, a drainage-chamber connected to the discharge-spout, and a bonnet member having a vent-opening to permit the entrance of air to the drainage-chamber when the valve has been moved to closed position.

3. In a device of the class specified, a valve-casing having a valve-seat, a valve, a discharge-spout, a drainage-chamber connecting with the spout, a bonnet having a vent-opening for the admission of air, a flange projecting inward from the bonnet and having a recess forming an air-passage, a valve-operating rod, a flange thereon, a cushion member between the two flanges, and an operating-knob secured to the outer end of the rod.

4. In a device of the class specified, a valve-casing having a discharge-passage, a drainage-chamber in communication therewith, an air-vent for placing the drainage-chamber in communication with the outer air, a valve, a valve-operating rod, a spring for retracting the rod, and a spring-inclosing casing arranged beyond the drainage-chamber.

In testimony that I claim the foregoing as my own I have hereto affixed my signature in the presence of two witnesses.

FREDERIC H. MASON

Witnesses:
 J. KENNEDY STOUT,
 J. ROSS COLHOUN.